(12) United States Patent
Woods et al.

(10) Patent No.: US 12,138,779 B2
(45) Date of Patent: Nov. 12, 2024

(54) DEVICE FOR GRIPPING A FLAT STRUCTURE WITH OPENINGS IN THE AREA OF ITS UPPER SIDE

(71) Applicant: Cevotec GmbH, Unterhaching (DE)

(72) Inventors: David Woods, Raubling (DE); Richard Carle, Munich (DE); Florian Lenz, Obergriesbach (DE)

(73) Assignee: Cevotec GmbH, Unterhaching (DE)

( * ) Notice: Subject to any disclaimer, the term of this patent is extended or adjusted under 35 U.S.C. 154(b) by 0 days.

(21) Appl. No.: 18/465,629

(22) Filed: Sep. 12, 2023

(65) Prior Publication Data
US 2024/0083042 A1    Mar. 14, 2024

(30) Foreign Application Priority Data

Sep. 14, 2022   (DE) ...................... 10 2022 123 476.2

(51) Int. Cl.
*B25J 15/00*   (2006.01)
(52) U.S. Cl.
CPC ................................. *B25J 15/0033* (2013.01)
(58) Field of Classification Search
CPC ........................ B25J 15/0033; B25J 15/0047; B25J 15/0071; B25J 15/0206
See application file for complete search history.

(56) References Cited

U.S. PATENT DOCUMENTS

| | | | |
|---|---|---|---|
| 4,975,020 A | 12/1990 | Kaasa | |
| 5,116,094 A * | 5/1992 | Jones | B25J 15/02 294/93 |
| 6,224,122 B1 | 5/2001 | Glenn | |
| 2007/0204569 A1* | 9/2007 | Doppenberg | B65G 47/90 53/459 |
| 2015/0274491 A1* | 10/2015 | Yada | B66C 1/58 414/591 |

FOREIGN PATENT DOCUMENTS

| | | | |
|---|---|---|---|
| DE | 102004007226 A1 | 9/2005 | |
| JP | 07256582 A * | 10/1995 | B25J 15/0071 |
| WO | 2005077787 A3 | 1/2006 | |

OTHER PUBLICATIONS

German Application No. 102022123476.2, German Search Report mailed Jun. 2, 2023, No English translation available, 7 pages.

* cited by examiner

*Primary Examiner* — Jason L Vaughan
*Assistant Examiner* — Amanda Kreiling
(74) *Attorney, Agent, or Firm* — Kilpatrick Townsend & Stockton LLP

(57) ABSTRACT

The present invention relates to a device for gripping a flat structure with openings in the area of its upper side, in particular a honeycomb structure, comprising two gripper units spaced apart from each other in a length direction, each of which in turn comprises at least one pin, and at least one pin displacement unit which is adapted to displace the at least one pin in an extending direction, as well as a tilting unit which is adapted to tilt at least one of the gripper units about a tilting axis extending substantially in a width direction. The invention also relates to a method for gripping a flat structure by means of such a device.

17 Claims, 2 Drawing Sheets

DEVICE FOR GRIPPING A FLAT STRUCTURE WITH OPENINGS IN THE AREA OF ITS UPPER SIDE

CROSS REFERENCE TO RELATED APPLICATION

Figure 1:
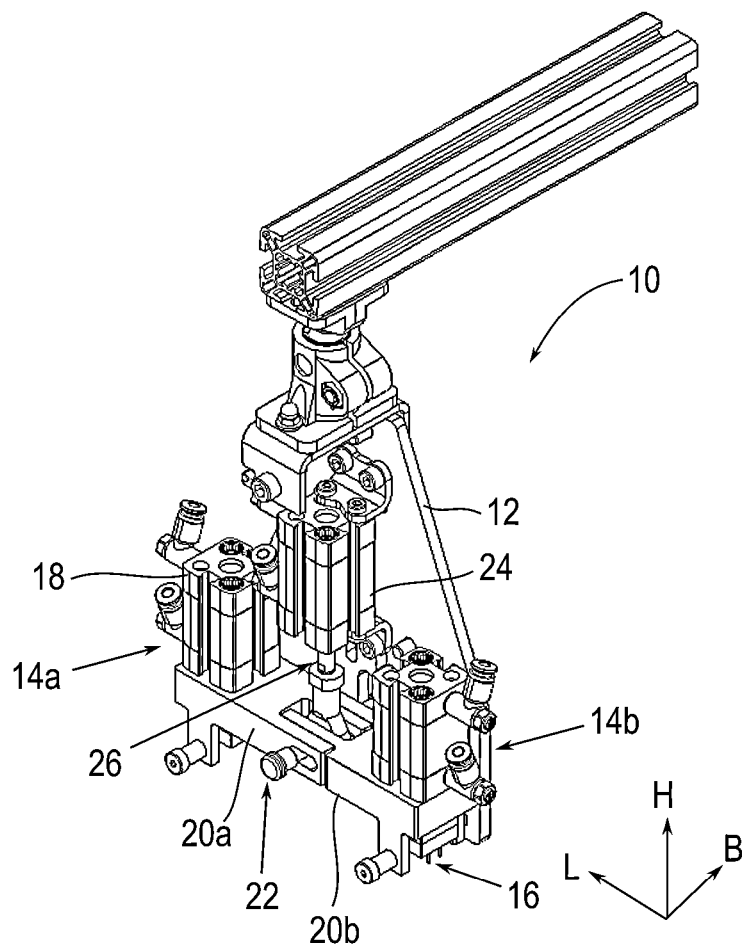

This application claims priority to German Patent Application No. 10 2022 123 476.2, filed in Germany on Sep. 14, 2022, the entire contents of which are hereby incorporated herein by this reference.

The present invention relates to a device for gripping a flat structure with openings in the area of its upper side, in particular a honeycomb structure, an assembly comprising at least two such devices, and a method for gripping a flat structure with openings in the area of its upper side, in particular a honeycomb structure, by means of such a device.

It is known that flat structures and in particular honeycomb structures must occasionally be transported during their processing, that is to say, picked up by means of a suitable device, moved to another location and then set down again. It should be noted that such structures are often made of relatively thin material in order to reduce their weight and are therefore easily damaged, so that they must be handled gently.

For this purpose, various approaches are known from the prior art for designing devices to handle such structures. For example, a device is known from U.S. Pat. No. 5,116,094 in which a plurality of pins are provided which project from arms on which they are mounted, the pins being inserted into the openings of the flat structure and then linearly moved apart so as to finally come into contact with walls of the structure, so that the resulting material connection allows the structure to be lifted and ultimately transported.

Similar approaches are also followed in DE 10 2004 007 226 A1 and U.S. Pat. No. 4,975,020, which similarly disclose devices in which pins, fingers or similar projecting elements are first inserted into openings of a flat structure and then linearly moved apart from each other so as to come into contact with walls of the structure and subsequently transport them.

However, it is clear that solutions known from the prior art are relatively inflexible, since the linear relative displacement of the pins or fingers makes it difficult or even impossible to handle curved flat structures. If such devices were nevertheless used on curved flat structures there would be a risk of damage, as the linear movement of the pins could cause strong global deformation of the structure, thus encouraging the material to crack. Finally, it should also be noted that, in configurations where several individual devices of the type just described are intended to work together to handle a curved flat structure, considerable additional effort would be required, as it would be necessary to ensure that the structure in question is oriented in a way that allows access to it with the respective devices, linearly displacing the pins or fingers away from each other.

It is therefore a task of the present invention to provide an improved device for gripping a flat structure with openings in the area of its upper side, characterized in particular in that it is also suitable for handling curved flat structures in the same way, but does not require any significant additional engineering effort and consequently does not present any economic disadvantages.

For this purpose, the device according to the invention comprises two gripper units spaced apart from each other in a length direction, each in turn comprising at least one pin and at least one pin displacement unit, the pin displacement unit being adapted to displace the at least one pin in an extending direction, and a tilting unit adapted to tilt at least one of the gripper units about a tilting axis extending substantially in a width direction.

It is apparent that the tilting of the at least two gripper units relative to each other makes it possible to set a suitable angle between the pins ultimately coming into contact with the structure in such a way that the device according to the invention can be adapted to differently curved flat structures and is therefore universally usable and flexible, while at the same time gentle handling of the flat structure can be achieved without significant additional effort.

In this context, the term "flat structure" is to be understood to include all structures which extend in a length direction, a width direction and, to a lesser extent, a height direction, it being expressly permissible, however, for the structure to be curved relative to this height direction. Convex, concave or convex-concave flat structures are therefore included in this definition.

In this context, it should also be noted that the directions used to describe the device, that is to say, the "length direction", the "width direction" and the "height direction", are only intended to illustrate the spatial relationships and, in particular, must be perpendicular to each other. Naturally, though, configurations are also possible in which the flat structure does not rest on a flat horizontal base at the start of an operating process of the device for gripping the structure, so that the corresponding "height direction" would then not run strictly vertically in space. Consequently, the length direction and the width direction would then also be tilted in space, but this is not a limitation of the present invention, rather it is expressly intended to be encompassed within it.

Similarly, the term "pins" is also to be understood broadly in the context of the present invention and is intended to encompass all elongated structures which are suitable for insertion in the manner described into the openings of the flat structure in order subsequently to be tilted together with the gripper units so that they come into contact with the material of the structure and allow it to be handled. Here it should also be noted that the extending direction of the pins can initially correspond to the height direction explained above, but configurations are also conceivable in which the gripper units are already at an angle to each other at the start of an operating process or are structurally predetermined with regard to their respective extending directions, so that only one or even none of the extending directions runs strictly in the height direction.

It should further be noted that the device according to the invention can be mounted on a higher-level functional unit which can ultimately effect the transport of the gripped flat structure. This can be, for example, a multi-axis robot arm or any other functional unit that can enable a displacement of the device together with the gripped flat structure in space. In certain embodiments, for example, manual movement of the device along certain paths together with the gripped structure would also be conceivable. Hence it will be apparent, here too, that the above-mentioned length, width and height directions of the device and the gripped structure can be pivoted in space through displacement by means of the functional unit.

In this case, coordinated control of the individual functional components of the device according to the invention can be carried out by means of a single control unit, which can further be coupled to external components so as to achieve integrated operation of the device in a higher-level context. In particular, the device's control unit can be coupled or integrated with a control unit of the higher-level functional unit so that the structure can be gripped by means of the device and subsequently transported and set down in a coordinated and optimized fashion.

To ensure secure gripping of the flat structure and to prevent it from slipping or tilting in the width direction and/or the length direction, each of the gripper units may comprise at least two pins spaced apart from each other in the width direction and displaceable in the extending direction. In this case, each of the pins can be assigned a separate pin displacement unit or a single pin displacement unit can be adapted to displace a plurality of pins at the same time, for example by being mechanically coupled to each other or integrally formed with each other.

To enable the two gripper units to tilt relative to each other, the device according to the invention may further comprise a base plate, with each of the gripper units being pivotably mounted on the base plate. Consequently, the tilting unit would then have to cause a tilting movement of the corresponding at least one gripper unit such that this is pivoted in relation to the base plate. In particular, it is conceivable to provide a pair of opposing base plates, the gripper units being inserted between the base plates and each being pivotably mounted thereon. Accordingly, the or one of the base plates or also another element mounted on the or one of the base plates could serve as an interface for attaching the device to the above-mentioned functional unit. However, other configurations of the device according to the invention are also conceivable, for example, a mounting of the gripper units could also be provided directly on the tilting unit, which could then directly bring about a corresponding pivoting movement, for example via actuators. In such embodiments with a tilting unit designed as at least one rotary actuator, it would then also be conceivable to provide a predefined distance control or force control during operation of the tilting unit in order to be able to grip the structure even more gently.

In a particularly simple embodiment, however, the device can also be configured in such a way that the gripper units can be tilted relative to each other about a single tilting axis running in the width direction. Consequently, a force would then have to be applied to this tilting axis by the tilting unit in order to cause the gripper units to tilt relative to each other.

Although the tilting axis could be disposed in such a way that the two gripper units perform a symmetrical relative tilting movement, in particular by disposing the tilting axis halfway between the gripper units with respect to the length direction, embodiments are also conceivable in which an asymmetrical tilting is desired, which can be caused in particular by disposing the tilting axis off-centre between the two gripper units with respect to the length direction. In this context, it would also be conceivable to dispose the tilting axis so as to be displaceable in the length direction, manually or with a drive, between the two gripper units, for example together with the entire tilting unit. This makes it possible to cover a range that allows both central placement of the tilting axis, and thus symmetrical tilting, and off-centre placement of the tilting axis in a predefined displacement range, and thus asymmetrical tilting of the two gripper units.

Of course, such asymmetrical tilting can also be achieved in other ways, for example, in embodiments of the device according to the invention in which the gripper units are directly pivoted by the tilting unit via rotary motors, each of these being controlled differently.

However, in the described embodiment with a single tilting axis, a tilting unit of particularly simple and reliable design can be achieved by the tilting unit being adapted to displace the tilting axis in a height direction so as to cause the gripper units to tilt. For this purpose, the two gripper units are then, for example, pivotably mounted on the base plate described above and also pivotably connected to the tilting axis, so that displacement of the tilting axis in the height direction is converted into a tilting movement of the gripper units.

Although essentially any design can be used for this purpose and the specific choice can be decided based on economic or integrative factors, the at least one pin displacement unit and/or the tilting unit can be formed as a hydraulic cylinder, pneumatic cylinder or electric linear actuator. In this case it will be understood that the corresponding components are controlled by means of control elements suitable for the type in question, thus for example by means of controllable hydraulic or pneumatic valves or electrical driver units.

Furthermore, each of the pins in the device according to the invention may have rounded tips to prevent damage to the material of the flat structure when gripping it, and generally so as to provide more extensive contact between the device and the structure. At this point, too, however, the design of the pins can in any case be adapted to a specific application, for example to the material, the wall thickness and/or the distances between the openings of the flat structure to be gripped.

According to a further aspect, the present invention relates to an assembly comprising at least two devices according to the invention of the type just described, which are spaced apart from each other in the width direction and/or the length direction. By operating the at least two devices in a coordinated fashion and, if necessary, displacing them independently of each other by means of at least one higher-level functional unit, the flexibility of this assembly is further increased compared to a single device of the type described above in that it possible to grip a flat structure in a plurality of areas. This further improves the ability to handle curved structures in particular, as the creation of additional spatial degrees of freedom enables safe gripping of even very irregularly curved structures.

For this purpose, at least two of the devices of the assembly can, in particular, be at an angle to each other with regard to their respective height directions or be adjustable in terms of this angle relative to each other. In this way, a curvature of the flat structure to be gripped can already be compensated between the individual devices.

According to a further aspect, the present invention relates to a method for gripping a flat structure having openings in the area of its upper side, in particular a honeycomb structure, by means of a device according to the invention of the type described above, comprising the steps of positioning the device with respect to its height direction above the flat structure, displacing the pins in the extending direction into the area of the flat structure, and tilting at least one of the gripper units about its tilting axis.

Accordingly, by means of the device used for this purpose, the method according to the invention can dispense with linear displacement of the pins away from each other in the length direction and the flat structure can be gripped simply by tilting at least one of the gripper units and then transported or otherwise handled in any desired manner. In this case it will be understood that the structure can be finally set down or delivered by reversing the above steps, that is to say, tilting the gripper units back to their initial position, moving the pins out of the area of the flat structure and removing the device from the structure.

Similarly, a method according to the invention for gripping a flat structure, in particular a honeycomb structure, can also be carried out by means of an assembly of the type described above, comprising the steps of positioning the devices with regard to their respective height directions above the flat structure, displacing the pins of at least some of the devices in the extending direction into the area of the flat structure, and tilting at least one of the gripper units of each of the devices about its respective tilting axis.

In both of the methods just described, to adjust the device or assembly before the step of displacing the pins, a step of initial tilting of at least one of the gripper units can be provided, so that the extending directions of the pins of the different gripper units are already at an angle with respect to each other, in particular so as to reproduce the shape of a curved flat structure, and then to further carry out the method according to the invention in the manner described above.

While the method according to the invention can be used for different types of flat structures, these may in particular be made of paper, impregnated paper or metal and/or have evenly spaced openings, as is the case for example in honeycomb structures. Other exemplary types of structures that can be gripped by means of the method according to the invention include organic or metallic foams, rubber structures or biological materials.

It should be noted that features, advantages or effects which are described with reference to the device and/or the assembly may be equally applicable to one of the methods according to the invention, and vice versa.

Other features and advantages of the present invention become clearer from the following description of an embodiment thereof when considered together with the accompanying figures. These show the following:

FIG. 1 An isometric view of a device according to the invention; and

Figure 2A:
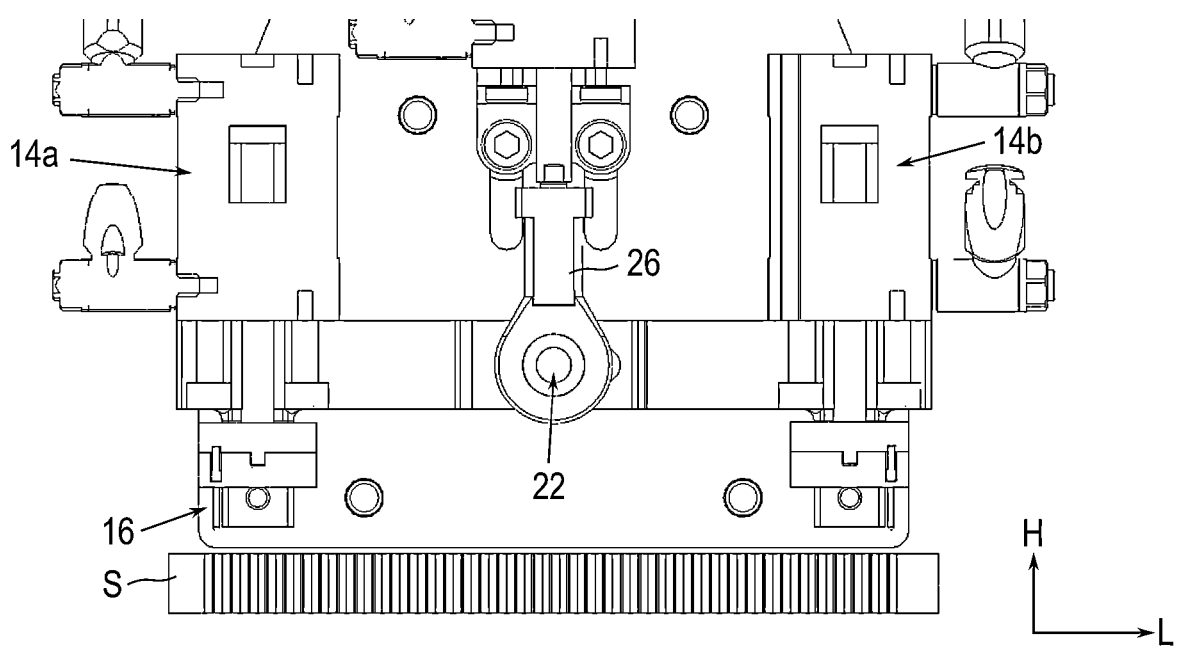
Figure 2B:
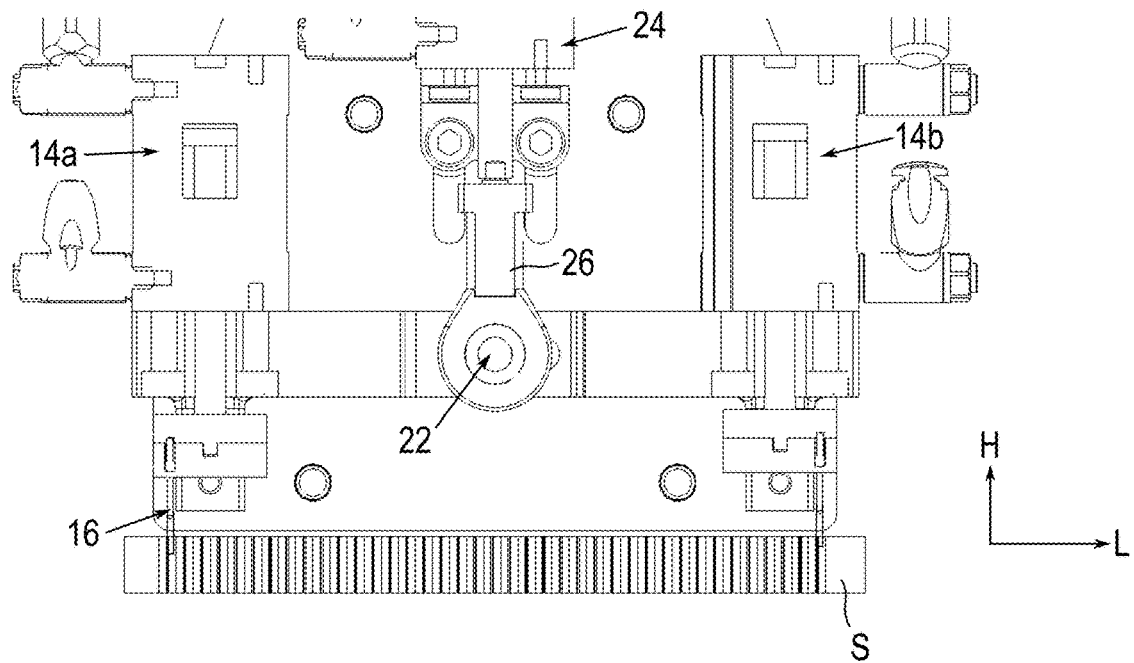
Figure 2C:
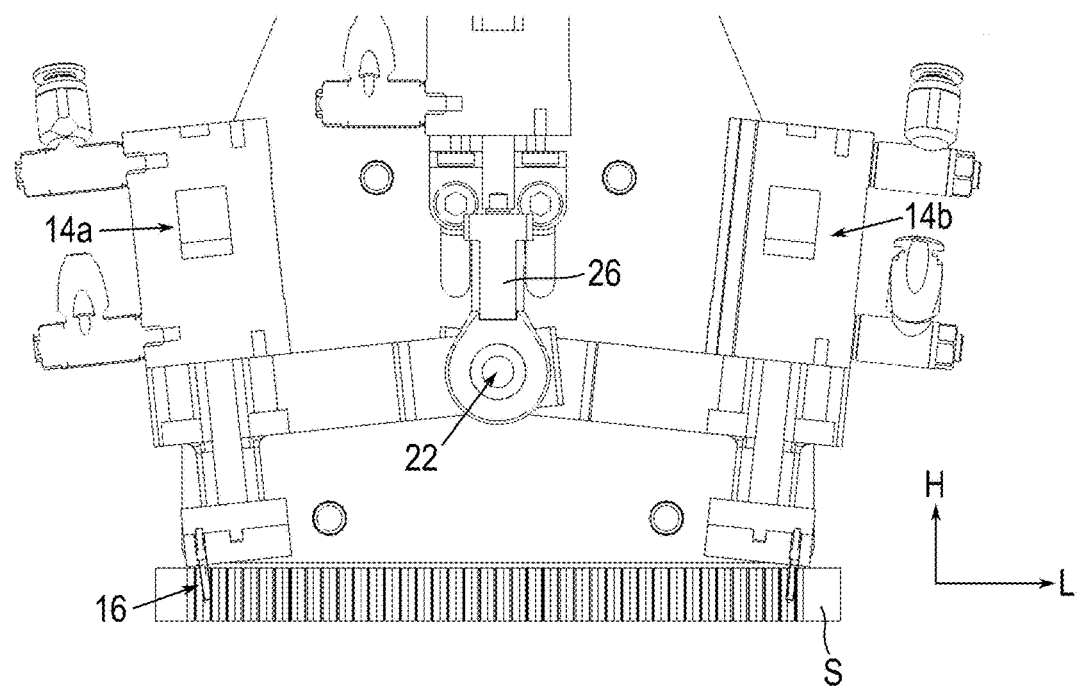

FIGS. 2a to 2c Views illustrating a process of gripping a flat structure with the device of FIG. 1.

In FIG. 1, a device according to the invention for gripping a flat structure with openings in the area of its upper side is firstly shown in an isometric view and generally designated by the reference sign 10. Here, a length direction L, a width direction B and a height direction H are defined in relation to the device 10 and indicated in FIG. 1 by coordinate arrows.

The device 10 comprises a base plate 12, which serves for the structural assembly of the functional components described below and which can also represent or comprise an interface with a higher-level structure, such as a robot arm indicated in FIG. 1 or a similar functional unit, which is adapted to move the device 10 as a whole in space, in particular together with a flat structure supported by it.

The device 10 comprises two gripper units 14a and 14b spaced apart from each other in the length direction L, each of which is pivotably mounted on the base plate 12 about a pivot axis extending in the width direction B, so that they can be tilted as a whole relative to each other. Each of the gripper units 14a and 14b comprises on its underside a pair of pins 16 spaced apart in the width direction B, and a respective pin displacement unit 18 by means of which the pins can be displaced in an extending direction. In the configuration shown in FIG. 1, the pins 16 of the two gripper units 14a and 14b are parallel with each other and the respective extending directions correspond precisely to the height direction H.

As can also be clearly seen in FIG. 1, the two gripper units 14a and 14b are each provided with arms 20a and 20b extending in the length direction L in the configuration shown, and are rotatably supported via these on a tilting axis 22 extending in the width direction B. By moving this tilting axis 22 in the height direction H, the end areas of the arms 20a and 20b facing away from the gripper units 14a and 14b are moved with it and the gripper units 14a and 14b are tilted accordingly. In this case, the arms 20a and 20b can be telescoped to adjust their length, or other suitable measures can be taken to enable the arms 20a, 20b and thus the gripper units 14a, 14b to tilt. At this point it should be noted that the tilting axis 22 in the embodiment shown in FIG. 1 runs centrally between the gripper units 14a and 14b in the length direction L, so that the two gripper units 14a and 14b will always be tilted symmetrically. However, alternative embodiments are of course also conceivable in which the tilting axis 22 is offset from the center towards one of the two gripper units 14a or 14b, so that tilting will take place asymmetrically.

To trigger the displacement of the tilting axis 22 in the height direction H and thus the tilting of the gripper units 14a and 14b, a tilting unit 24 is provided in the upper area of the base plate 12, which is connected to the tilting axis 22 via a piston rod 26 and is able to displace it linearly. In the embodiment shown here, the two pin displacement units 18 and the tilting unit 24 are each designed as linear-acting pneumatic cylinders which can be supplied with compressed air in a controlled manner via suitable connections so that they can be operated in a controlled and coordinated fashion. For this purpose, control components not shown in FIG. 1 can be used, for example controllable valves and an electronic control unit coupled thereto, which can also create a functional interface with higher-level structures or can already be integrated into a higher-level structure. At this point it should be further noted that, in other variants of a device according to the invention, the two pin displacement units 18 and the tilting unit 24 can also be formed as hydraulic cylinders and/or as electric linear actuators.

The operation of the device 10 and a method of operating it will now be explained with reference to FIGS. 2a to 2c. FIGS. 2a to 2c each show a different state of the device 10 during gripping of a flat structure S with openings in the area of its upper side in the form of a honeycomb structure, viewed from the front in the width direction B.

Here it can be seen that, in the state shown in FIG. 2a, the device 10 has firstly been positioned above the flat structure S with respect to the height direction H, each of the two gripper units 14a and 14b being aligned in such a way that their respective pins 16 also extend strictly in the height direction H.

FIG. 2b, on the other hand, shows a state in which the pins 16 have been lowered in the height direction H by means of the respective pin displacement units 18 and have thus entered the openings in the structure S. At this point it should be noted that the two pins 16 of each of the gripper units 14a and 14b are attached to a common base element, which is displaced as a whole by the respective pin displacement unit 18. However, variants of the device 10 are also conceivable in which each of the pins is assigned its own pin displacement unit.

Finally, FIG. 2c shows a state in which the tilting axis 22 has been displaced upwards in the height direction H by actuation of the tilting unit 24, so that the two gripper units 14a and 14b have been tilted such that their pins 16 point downwards and towards each other in the height direction H and come into contact with the walls of the flat structure S due to the resulting angle.

Due to the resulting material connection between the device 10 and the structure S, the latter has now been gripped and can be transported. It will be understood that, in order to deposit or set down the structure S, the conditions of FIGS. 2a to 2c can be cycled through in reverse sequence, that is to say, the gripper units 14a and 14b can be tilted back to their initial position and then the pins 16 retracted and/or the device 10 removed from the area of the structure S. It can be seen from the figures shown here that the device 10 is particularly suitable for gripping a curved flat structure, since, in the state shown in FIG. 2c, the angles of the pins 16 can compensate for different conceivable curvatures of such a structure, and, also in the states shown in FIGS. 2a and 2b, the gripper units 14a and 14b can already have an initial tilting angle corresponding to the curvature, so that the extending directions of the pins 16 can be adapted to this curvature from the outset.

The invention claimed is:

1. Device for gripping a flat structure with openings in an upper side area, in particular a honeycomb structure, comprising:
    two gripper units spaced apart from each other in a length direction, each of them in turn comprising:
        at least one pin; and
        at least one pin displacement unit adapted to displace the at least one pin in an extending direction; and
    a tilting unit which is adapted to tilt at least one of the gripper units about a tilting axis extending substantially in a width direction.

2. Device according to claim 1,
    wherein each of the gripper units comprises at least two pins spaced apart in the width direction and displaceable in the extending direction.

3. Device according to claim 2,
    wherein a separate pin displacement unit is associated with each of the pins.

4. Device according to claim 1,
    further comprising a base plate,
    wherein each of the gripper units is pivotably mounted on the base plate.

5. Device according to claim 1,
    wherein the two gripper units are tiltable relative to each other about a single tilting axis extending in the width direction.

6. Device according to claim 5,
    wherein the tilting axis is disposed off-centre with respect to a length direction between the two gripper units to allow asymmetric tilting.

7. Device according to claim 5,
    wherein the tilting unit is adapted to displace the tilting axis in a height direction to cause tilting of the gripper units.

8. Device according to claim 1,
    wherein the at least one pin displacement unit and/or the tilting unit is formed as a hydraulic cylinder, pneumatic cylinder or electric linear actuator.

9. Device according to claim 1,
    wherein the pins each have rounded tips.

10. Assembly comprising at least two devices according to claim 1 which are spaced apart in a width direction and/or a length direction.

11. Assembly according to claim 10,
    wherein the at least two devices are at an angle to each other with regard to their respective height directions or are adjustable in terms of this angle relative to each other.

12. Method of gripping a flat structure having openings in an upper side area, in particular a honeycomb structure, by means of an assembly according to claim 10, comprising the following steps:
    Positioning the two devices with regard to their respective height directions above the flat structure;
    Displacing the pins of at least some of the two devices in the extending direction into the area of the flat structure; and
    Tilting at least one of the gripper units of each of the two devices about its respective tilting axis.

13. Method of gripping a flat structure having openings in an upper side area, in particular a honeycomb structure, by means of a device according to claim 1, comprising the following steps:
    Positioning the device with respect to its height direction above the flat structure;
    Displacing the pins in the extending direction into the area of the flat structure; and
    Tilting at least one of the gripper units about its tilting axis.

14. Method according to claim 13
    further comprising, prior to the step of displacing the pins, a step of initially tilting at least one of the gripper units.

15. Method according to claim 13,
    wherein the flat structure is formed of paper, impregnated paper or metal and/or has evenly spaced openings.

16. Device according to claim 1, wherein
    the at least one pin is extendable from the gripper unit and retractable into the gripper unit.

17. Device for gripping a flat structure with openings in an upper side area, in particular a honeycomb structure, comprising:
    two gripper units spaced apart from each other in a length direction, each of them in turn comprising:
        at least one pin extendable from the gripper unit and retractable into the gripper unit; and
        at least one pin displacement unit adapted to displace the at least one pin in an extending direction; and
    a tilting unit which is adapted to tilt at least one of the gripper units about a tilting axis extending substantially in a width direction.

* * * * *